United States Patent

[19] Peter

[11] Patent Number: 5,969,115
[45] Date of Patent: Oct. 19, 1999

[54] BISAZO DYES AND THEIR PREPARATION AND USE

[75] Inventor: Heinz Peter, Fribourg, Switzerland

[73] Assignee: Ilford Imaging Switzerland GMBH, Switzerland

[21] Appl. No.: 09/165,041

[22] Filed: Oct. 1, 1998

[30] Foreign Application Priority Data

Oct. 3, 1997 [EP] European Pat. Off. ............ 97810736

[51] Int. Cl.$^6$ .......................... C09B 31/08; C09B 67/26; C09D 11/02
[52] U.S. Cl. .............. 534/829; 534/836; 8/527; 106/31.52
[58] Field of Search .................. 534/829, 836; 8/527; 106/31.52

[56] References Cited

U.S. PATENT DOCUMENTS

| | | | |
|---|---|---|---|
| 4,626,284 | 12/1986 | Ohta et al. | 106/31.52 |
| 4,963,189 | 10/1990 | Hindagolla | 106/31.52 |
| 5,053,495 | 10/1991 | Greenwood et al. | 534/829 |
| 5,062,893 | 11/1991 | Adamic et al. | 106/31.52 |
| 5,439,517 | 8/1995 | Yoshida et al. | 106/31.52 X |
| 5,580,965 | 12/1996 | Jager | 534/829 |
| 5,616,696 | 4/1997 | Leary, Jr. | 534/667 |
| 5,647,897 | 7/1997 | Ouki et al. | 106/31.52 X |

FOREIGN PATENT DOCUMENTS

| | | |
|---|---|---|
| 0356080 | 2/1990 | European Pat. Off. . |
| 0597672 | 5/1994 | European Pat. Off. . |
| 0735106 | 10/1996 | European Pat. Off. . |
| 3436891 | 4/1985 | Germany . |

*Primary Examiner*—Fiona T. Powers
*Attorney, Agent, or Firm*—Ostrager Chong; Flaherty & Onofrio

[57] ABSTRACT

Bisazo dyes of formula (IX)

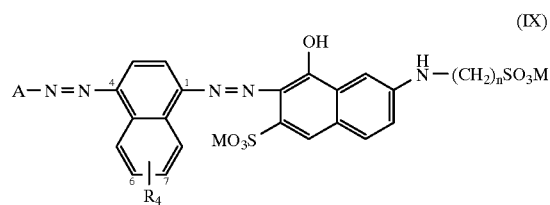

and of formula (X)

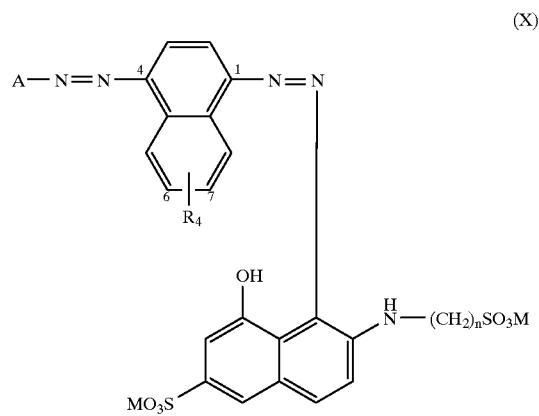

wherein A, $R_4$, M and n are as defined in the specification, are excellent dyes for dyeing and printing of cellulose containing materials and especially for the preparation of inks for ink jet printing.

10 Claims, No Drawings

BISAZO DYES AND THEIR PREPARATION AND USE

FIELD OF THE INVENTION

This invention relates to novel bisazo dyes and their salts, a method of their preparation and their use in dying and printing operations. It relates also to liquid dye preparations containing these dyes, particularly to aqueous inks for ink jet printing.

BACKGROUND OF THE INVENTION

Ink jet printing processes are of two types, continuous stream and drop-on-demand.

In continuous stream ink jet printing systems, ink is emitted in a continuous stream under pressure through a nozzle. The stream is perturbed, causing it to break up into droplets at a fixed distance from the nozzle. At the break-up point, the droplets are charged in accordance with digital data signals and passed through an electric static field which adjusts the trajectory of each droplet in order to direct it to a gutter for recirculation or to a specific location on a recording medium.

In the non-continuous process, or the so called "drop-on-demand" systems, a droplet is expelled from a nozzle to a position on a recording medium in accordance with digital data signals. A droplet is not formed and expelled unless it is to be placed on the recording medium.

The most important part of an ink for ink jet printing are the dyes. Although a number of dyes have been proposed none meets all the requirements of a modem printing process.

C. I. Foodblack 2 (formula 1) and dyes having similar structures have been mentioned in JP Patent Application 59-093,766 as dyes for black ink jet inks.

These dyes, however, appear somewhat bluish black. The light fastness of images with these dyes is not sufficient.

Black dyes of general formula (II) or mixtures thereof have been described for example in U.S. Pat. No. 4,626,284,

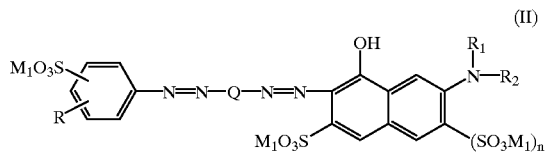

wherein Q represents a phenylene or a naphthylene group substituted by a $SO_3M_1$ group; R represents a hydrogen atom, a lower alkyl group, a lower alkoxy group, a lower acylamino group, a nitro group or a halogen atom; $R_1$ represents a phenyl group substituted by $SO_3M_1$ or $COOM_1$, a lower alkyl group substituted by $COOM_1$ or a lower alkyl group substituted by a lower alkylaminocarbonyl group; $R_2$ represents a hydrogen atom, a lower alkyl group substituted by $COOM_1$ or a lower alkyl group substituted by a lower alkylaminocarbonyl group; $M_1$ represents an alkali metal cation or an ammonium cation; and n represents 0 or 1.

Black dyes of general formula (III) or mixtures thereof have been described for example in U.S. Pat. No. 4,724,001, (I)

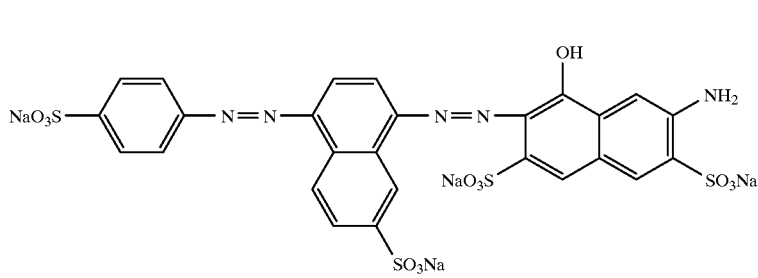

(C.I. Foodblack 2)

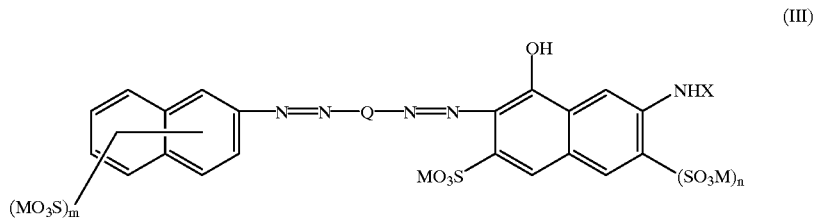

wherein Q represents a phenylene group substituted by a methyl group, a methoxy or an ethoxy group or a naphthalene group substituted by SO₃M; X represents a hydrogen atom or a phenyl group substituted by SO₃M; m represents 1 or 2; n represents 1 when X represents a hydrogen atom and n represents 0 when X represents a phenyl group substituted by SO₃M or when Q represents a naphthalene group substituted by SO₃M; and M represents an alkali metal cation or an ammonium cation.

Anionic black dyes of general formula (IV) are described in U.S. Pat. No. 5,053,495,

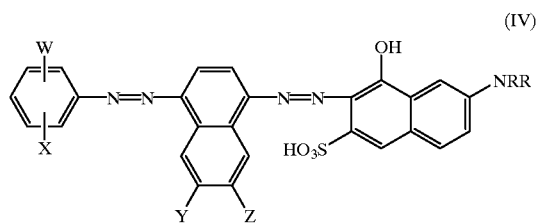
(IV)

wherein W represents COOH; X is selected from the group consisting of hydrogen, COOH, SO₃H, halogen, hydroxy, nitro, cyano, alkyl with 1 to 6 C atoms, alkoxy with 1 to 6 C atoms and acylamino with 1 to 6 C atoms; Y represents hydrogen, COOH or SO₃H; Z represents hydrogen, COOH or SO₃H; R and R¹ represent independently hydrogen or alkyl with 1 to 6 C atoms substituted by 0, 1 or 2 COOR² groups; and R² represents hydrogen or alkyl with 1 to 6 C atoms provided that there are at least two COOH groups and the number of COOH groups is equal to or greater than the number of SO₃H groups.

These dyes are claimed to provide different water solubility depending on pH. On a plain paper substrate with pH from 5 to 7 the water solubility of these dyes is much lower than at higher pH. Therefore these dyes will be more resistant to removal from the substrate by washing than dyes without COOH groups.

These dyes however have the disadvantage that they show poor smudge behavior due to bronzing, as they aggregate easily on the surface of the recording medium and do not penetrate or only slightly penetrate into the interior of the recording medium. Although they can provide pure blacks on plain paper or coated paper, these dyes appear somewhat bluish black on other recording media.

Black dyes with improved water fastness of general formula (V) are described in Patent Application EP 0,612,820,

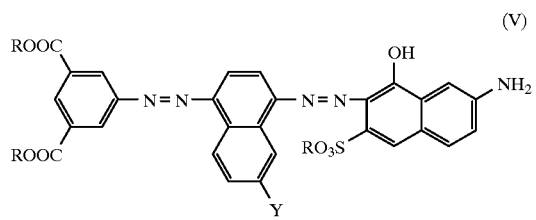
(V)

wherein R represents NH₄ and Y represents hydrogen or SO₃R. These dyes however do not show a neutral black hue and therefore a yellow dye has to be added to the black ink.

Black dyes with improved water fastness of general formula (VI) are described in Patent Application EP 0,597,672,

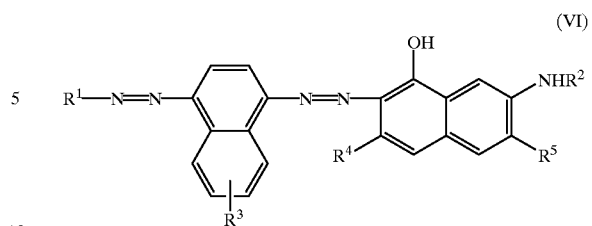
(VI)

wherein R¹ represents a phenyl group or a naphthyl group which may be substituted optionally by OH, NH₂, SO₃M or COOM, wherein M represents a hydrogen atom, an alkali metal cation, an ammonium cation or an amine cation; R² represents carboxyalkyl, wherein the carboxy group may form a salt with an alkali metal or ammonia, substituted or unsubstituted alkoxyalkyl, substituted or unsubstituted phenyl or hydroxyalkyl; and R³, R⁴ and R⁵ represent independently hydrogen or SO₃M, wherein M is as defined above, provided that R¹ is not phenyl substituted by SO₃M when R³, R⁴ and R⁵ all represent SO₃M.

These dyes however do not show a neutral black hue and therefore a yellow dye has to be added to the black ink.

Only a few dyes represented by general formula (VI), wherein R¹ represents phenyl substituted by SO₃H and R³, R⁴ and R⁵ all represent SO₃M, with particular structures may be combined with other dyes, because most combinations deteriorate the storage stability of the inks or the light fastness of the printed images.

Black dyes of general formula (VII) are described in Patent Application EP 0,735,106,

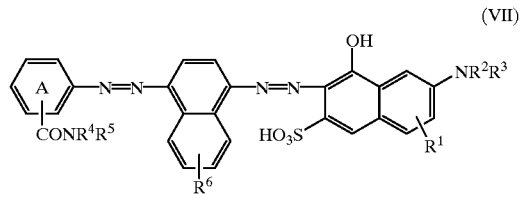
(VII)

wherein the carboxamido group of ring A is in ortho, meta or para position to the azo group; R¹ represents hydrogen or SO₃H; R² and R³ independently represent hydrogen, optionally substituted aryl with 6 or 10 C atoms or optionally substituted alkyl with 1 to 6 C atoms; R⁴ and R⁵ independently represent hydrogen, optionally substituted aryl with 6 or 10 C atoms or optionally substituted alkyl with 1 to 17 C atoms and R⁶ represents hydrogen, COOH or SO₃H and ring A optionally is further substituted.

Black dyes of general formula (VII) are described in U.S. Pat. No. 5,616,696,

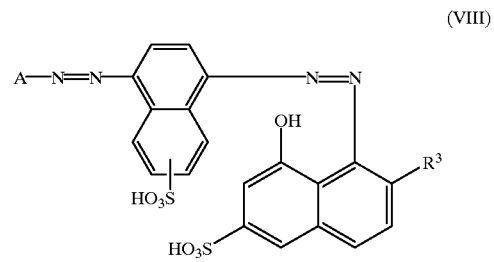
(VIII)

wherein A represents a 1-(3-carboxy-4-hydroxyphenyl) group; R² represents hydrogen or an aromatic azo group and $R^3$ represents amino, aromatically substituted amino or an aromatic azo group.

Dyes of general formula (VIII), wherein $R^2$ represents hydrogen and $R^3$ represents amino, do not show a black with neutral hue, instead they show a marked bluish tint. These dyes are essentially insoluble and their light fastness is inferior to the light fastness of similar dyes of general formula (VII).

Dyes having the structures mentioned above are considered to be state of the art and do not satisfy all the required demands when used in aqueous inks for ink jet printing.

Dyes used for such recording liquids have to be sufficiently soluble in the aqueous ink liquid, they have to penetrate into the recording medium and should not show dye aggregation on the surface of the recording medium ("bronzing"). They need to provide printed images having high optical density, good water fastness and excellent light fastness. They need to be stable in the ink even when the recording liquid is stored for a long time under adverse conditions.

Various types of compositions have been proposed as inks for ink jet printing. Typical inks comprise one or more dyes, water, organic cosolvents and other additives.

The inks have to meet the following criteria:

(1) The ink gives high quality images on any type of recording medium.

(2) The ink gives printed images exhibiting excellent water fastness.

(3) The ink gives printed images exhibiting excellent light fastness.

(4) The ink gives printed images exhibiting excellent smudge behavior.

(5) The ink does not clog jetting nozzles even when these are kept uncapped while recording is suspended.

(6) The ink can be stored for long periods of time without deterioration of its quality.

(7) The values of the physical properties of the inks as viscosity, conductivity and surface tension are all within a defined range well suited for the application.

(8) The ink has to be non toxic, not flammable and safe.

Reactive black dyes have also been proposed for ink jet printing for example in Patent Application EP 0,693,537. However, inks containing dyes with reactive groups deteriorate during storage and due to their potential health risk are less suitable for handling in a non-chemical environment, where ink jet printing is normally done.

DESCRIPTION OF THE INVENTION

This invention relates to novel black bisazo dyes, especially for ink jet printing, having high solubility, which provide images or dyed materials having a neutral black color, high optical density, excellent water fastness, excellent light fastness and excellent smudge behavior.

Another object of the present invention is the provision of liquid dye preparations, especially of ink compositions for ink jet printing, showing a neutral black color on any type of recording medium as plain or coated paper, coated or uncoated, opaque or transparent synthetic materials.

A further object of the present invention is to provide recording liquids satisfying all the requirements mentioned above.

The present invention relates to novel black dyes of general formula (IX)

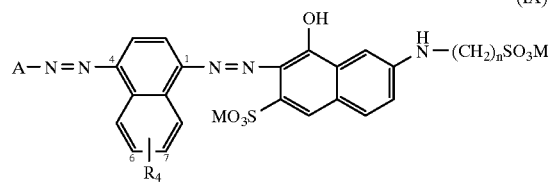

and of formula (X)

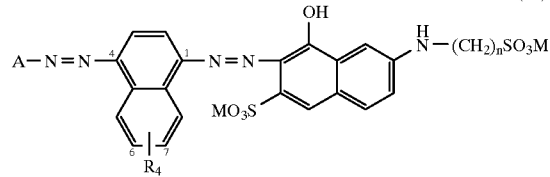

wherein

A represents optionally substituted phenyl or optionally substituted naphthyl of general formula (XI),

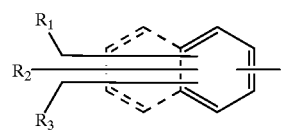

wherein $R_1$, $R_2$ and $R_3$ independently represent hydrogen, $SO_3M$, COOM; carboxamido, N-substituted carboxamido, preferentially N-carboxymethylcarboxamido and N-(2-adipyl)-carboxamido, optionally substituted alkyl with 1 to 18 C atoms, preferentially hydroxymethyl, carboxymethyl, sulfomethyl, phosphonomethyl, hydroxyethyl, carboxyethyl, cyanoethyl and 4-carboxybutyl, optionally substituted alkoxy with 1 to 18 C atoms, preferentially 2-hydroxyethyloxy or ω-sulfoalkoxy, halo, hydroxy, cyano or optionally substituted thioalkyl with 1 to 18 C atoms, preferentially ω-sulfothioethyl or ω-sulfothiopropyl; provided that A represents substituted phenyl;

or independently represent hydrogen, $SO_3M$ or COOM, provided that A represents substitutes naphthyl;

$R_4$ represents hydrogen or $SO_3M$;

n is 2, 3 or 4;

and

M represents hydrogen, a metal cation or an ammonium cation, optionally substituted by one or more alkyl or substituted alkyl groups each having 1 to 18 C atoms.

When A is substituted phenyl $R_1$ preferentially represents $SO_3M$ or COOM and $R_2$ and $R_3$ are selected from the group consisting of hydrogen, chloro, hydroxy, COOM, optionally substituted alkyl with 1 to 12 C atoms and optionally substituted alkoxy with 1 to 12 C atoms.

When $R_1$ is optionally substituted alkyl or alkoxy it preferably has from 1 to C atoms.

When A is substituted naphthyl it preferably carries one to three substituents selected from $SO_3M$ or COOM. Still more preferably it is substituted by one or two sulfo groups.

It is especially preferred if $R_4$ is in positions 6 or 7 in compounds of formulas (IX) and (X).

The compounds of formulas (IX) and (X) preferably have at least as many SO₃M substituents as COOM substituents. It is especially preferred if the number of SO₃M substituents is higher than the number of COOM substituents.

Especially preferred are compounds of formula (XII)

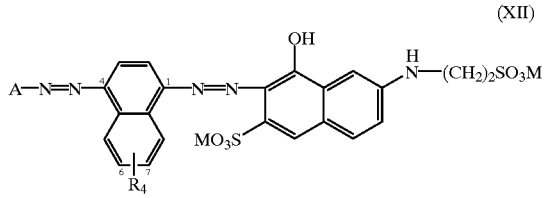
(XII)

and of formula (XIII)

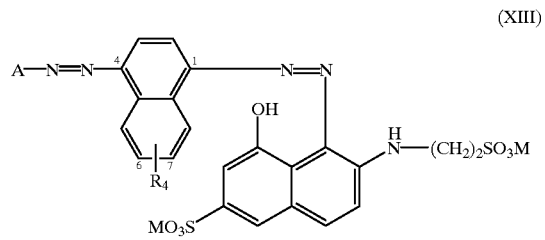
(XIII)

wherein the substituents A and R₄ are as described above and n is equal to 2.

The compounds of formulas (IX), (X), (XII) and (XIII) may be in the free acid form or in the form of inorganic or organic salts thereof. Preferably they are in the form of salts with cations such as alkali metal or ammonium, wherein the ammonium cation may be substituted. Examples of such substituted ammonium cations are 2-hydroxyethylammonium, bis-(2-hydroxyethyl)-ammonium, tris-(2-hydroxyethyl)-ammonium, bis-(2-hydroxyethyl)-methyl-ammonium, tris-[2-(2-methoxyethoxy)-ethyl]-ammonium, 8-hydroxy-3,6-dioxaoctylammonium and tetraalkylammonium as for example tetramethylammonium or tetrabutylammonium.

It is to be understood that the present invention covers not only dyes of formulas (IX), (X), (XII) and (XIII), but also all tautomeric forms of these compounds. The invention does not only cover pure dyes of formulas (IX), (X), (XII) and (XIII), but also mixtures of these compounds.

The invention further claims a process for the preparation of compounds of formulas (IX) and (X) characterized in that an amine of formula (XIV)

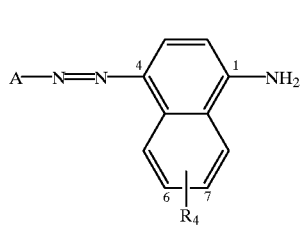
(XIV)

wherein A is defined as above, is diazotized and coupled with a compound of formula (XV)

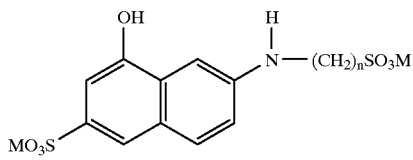
(XV)

as described for example in Patent GB 2,289,473. Depending on the type of amine of formula (XIV), on the value of pH during the coupling reaction, on the type of acid-binding agent used for maintaining a constant pH value during the coupling reaction, dyes of formulas (IX) or (XII) or mixtures of dyes of formulas (IX) and (X) or (XII) and (XIII) are obtained.

The dyes of formulas (IX), (X), (XII) and (XIII) are used to dye cellulose containing materials, paper, cotton and viscose as well as leather and wool to provide the dyed material with good water and light fastness.

Methods well known in the textile and paper industries for dyeing with substantive dyes may be used with the dyes according to our invention, preferably for the bulk or surface treatment of sized or unsized paper. The dyes may also be used in the dyeing of yarns and piece goods of cotton, viscose and linen by the exhaustion process from a long liquor or in continuous processes.

The invention furthermore relates to liquid dye preparations comprising at least one dye of formula (IX) or (X). The use of such liquid dye preparations is preferred for paper dyeing. Such stable, liquid, preferably aqueous, and concentrated dye preparations may be obtained by using methods well known in the art, preferably by dissolving in suitable solvents. The possibility of preparation of such stable aqueous concentrated preparations in the course of dye synthesis itself, without intermediate isolation of the dye, is of particular advantage.

Dyes or mixtures of dyes represented by formulas (IX) and (X) and especially by formulas (XII) and (XIII) are black dyes for the preparation of black recording liquids for ink jet printing.

A suitable ink comprises one or more compounds according to the invention in a liquid aqueous medium. The ink contains from 0.5 to 20% by weight, preferably from 0.5 to 5% by weight, of this or these compounds, based on the total weight of the ink. The liquid medium is preferably water or a mixture comprising water and water miscible organic solvents. Suitable media are given for example in U.S. Pat. Nos. 4,626,284, 4,703,113, 4,963,189 and in Patent Applications GB 2,289,473, EP 0,425,150 and 0,597,672.

The present invention will be illustrated in more detail by the following examples without limiting the scope of the claimed compounds in any way.

EXAMPLES

EXAMPLE 1

Compound No. 5 from Table 1 was prepared in the following way:

Suspension A:

13.5 g of the disodium salt of 1-amino-4-(4-sulfophenylazo)-7-naphthalenesulfonic acid were suspended in 90 ml of water. 8 ml of an aqueous solution of sodium nitrite (4 N) were added under stirring.

Solution B:

17.5 ml of aqueous hydrochloric acid (37%) were added to a mixture of 15 g of water and ice. The temperature was reduced under stirring to 0°–50° C.

Suspension C:

Suspension A was added under stirring to solution B within 50 minutes while maintaining the temperature at 0°–5° C. The reaction mixture was stirred for one further hour at this temperature. The excess of nitrous acid was removed by reaction with sulfaminic acid.

Solution D:

10.4 g of the sodium salt of N-(2-sulfoethyl)-gamma acid and 0.21 g of Olin 10 G (50%) (available from Olin Corporation, Norwalk, USA) were suspended in 45 g of water and pH was adjusted to 8.0 by addition of an aqueous solution of sodium hydroxide (20%). The resulting solution was cooled down to a temperature of 0°–5° C.

Preparation of the dye:

Suspension C was added under stirring within 60 minutes to solution D at a temperature of 0°–5° C. while maintaining pH at 8.0 by addition of an aqueous solution of sodium hydroxide (20%). Stirring was continued for 2 hours at a temperature of 0°–50° C. and for a further 16 hours at room temperature. The dye was salted out by addition of sodium chloride, the precipitate was filtered off, purified by a double precipitation from water/ethanol and dried. 16.5 g of compound No. 5 were obtained.

EXAMPLE 2

Compound No. 21 (mixture of dyes of general formulas (XII) and (XIII)) from Table 2 was prepared in the following way:

Suspension A:

21.6 g of the disodium salt of 1-amino-4-(3-carboxy-4-hydroxyphenylazo)-7-naphthalenesulfonic acid were suspended in 75 ml of water. 13 ml of an aqueous solution of sodium nitrite (4 N) were added under stirring.

Solution B:

33 ml of aqueous hydrochloric acid (37%) were added to a mixture of 75 g of water and ice. The temperature was reduced under stirring to 0°–5° C.

Suspension C:

Suspension A was added under stirring to solution B within 45 minutes while maintaining the temperature at 0°–5° C. The reaction mixture was stirred for a further two hours at this temperature. The excess of nitrous acid was removed by reaction with sulfaminic acid.

Solution D:

18.5 g of the sodium salt of N-(2-sulfoethyl)-gamma acid and 2.1 g of sodium hydrogenphosphate were suspended in 75 g of water and pH was adjusted to 9.0 by addition of an aqueous solution of sodium hydroxide (20%). The resulting solution was cooled down to a temperature of 0°–50° C.

Preparation of the dye: Suspension C was added under stirring within 60 minutes to solution D at a temperature of 0°–5° C. while maintaining pH at 9.0 by addition of an aqueous solution of sodium hydroxide (20%). Stirring was continued for one hour at a temperature of 0°–5° C. and for a further 16 hours at room temperature. The dye was salted out by addition of sodium chloride, the precipitate was filtered off, purified by precipitation from water/ethanol and dried. 29.6 g of compound No. 21 were obtained.

EXAMPLE 3

Compound 22 (mixture of dyes of general formulas (XII) and (XIII)) from Table 2 was prepared in the following way:

Suspension A, solution B and suspension C are as in example 2.

Solution D:

18.5 g of the sodium salt of N-(2-sulfoethyl)-gamma acid and 0.41 g of sodium acetate were suspended in 75 g of water and the value of pH was adjusted to 5.5 addition of an aqueous solution of sodium carbonate (20%). The resulting solution was cooled to a temperature of 0°–5° C.

Preparation of the dye:

Suspension C was added under stirring within 75 minutes to solution D at a temperature of 0°–50° C. while maintaining pH at 5.5 by addition of an aqueous solution of sodium carbonate (20%). Stirring was continued for one hour at a temperature of 0°–5° C. and for a further 16 hours at room temperature. The precipitated dye was filtered off and dried. 15.9 g of compound No. 22 were obtained.

Prepared salts of compounds of formula (XII) are listed in Table 1. $R_4$ is $SO_3M$ and M is Na for all compounds.

TABLE 1

| Compound No. | A | Position of $R_4$ |
|---|---|---|
| 1 | 3-(HOCH$_2$)-phenyl | 7 |
| 2 | 3-(MOOC)-phenyl | 7 |
| 3 | 4-(MO$_3$S)-phenyl | 7 |
| 4 | 4-(MO$_3$S)-phenyl | 6 |
| 5 | 3-(MO$_3$S)-phenyl | 7 |
| 6 | 3-(MO$_3$S)-phenyl | 6 |
| 7 | 4-(MOOCCH$_2$)-phenyl | 7 |
| 8 | 4-(MO$_3$SCH$_2$)-phenyl | 7 |

TABLE 1-continued

| Compound No. | A | Position of $R_4$ |
|---|---|---|
| 9 | 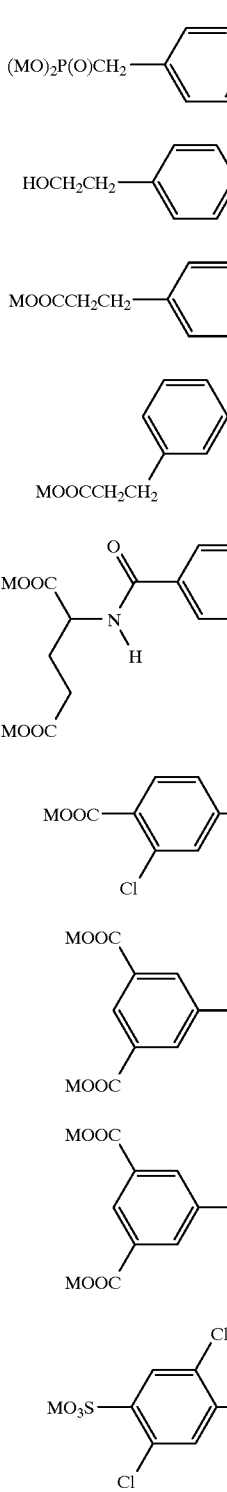 MO₃SCH₂— | 6 |
| 10 | 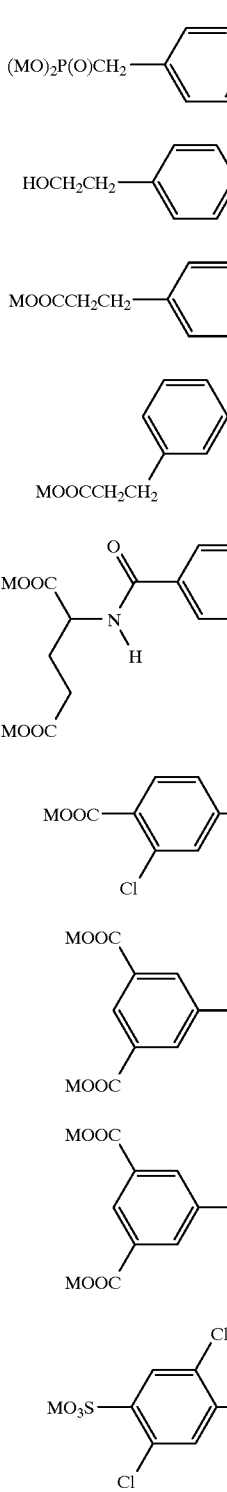 (MO)₂P(O)CH₂— | 7 |
| 11 | 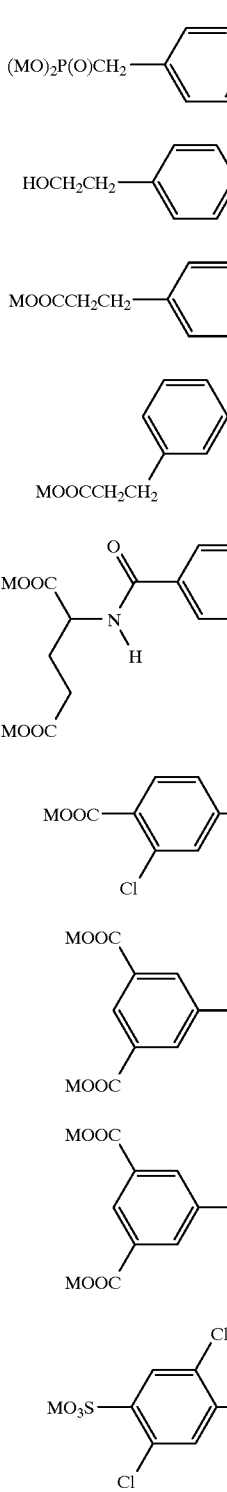 HOCH₂CH₂— | 7 |
| 12 | 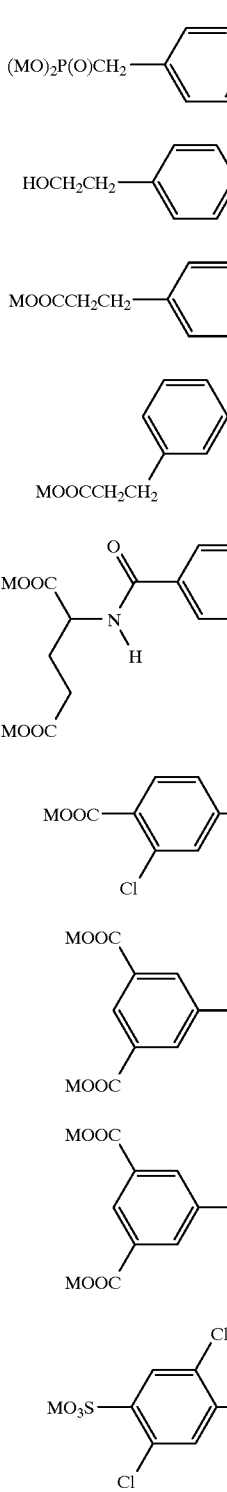 MOOCCH₂CH₂— | 7 |
| 13 | 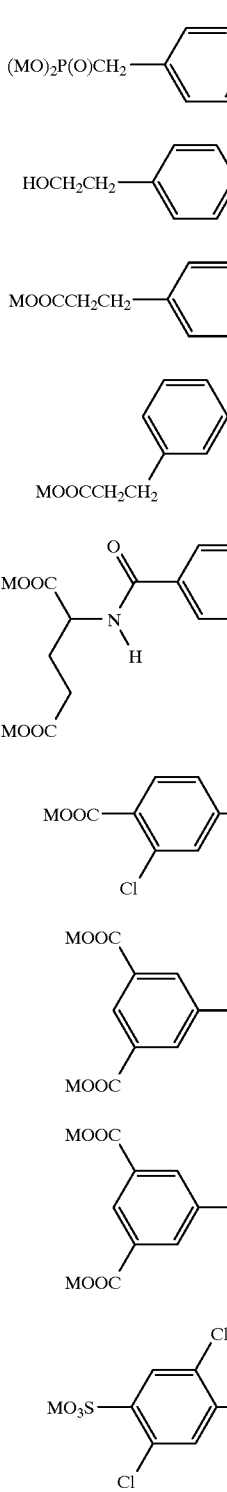 MOOCCH₂CH₂— | 7 |
| 14 | 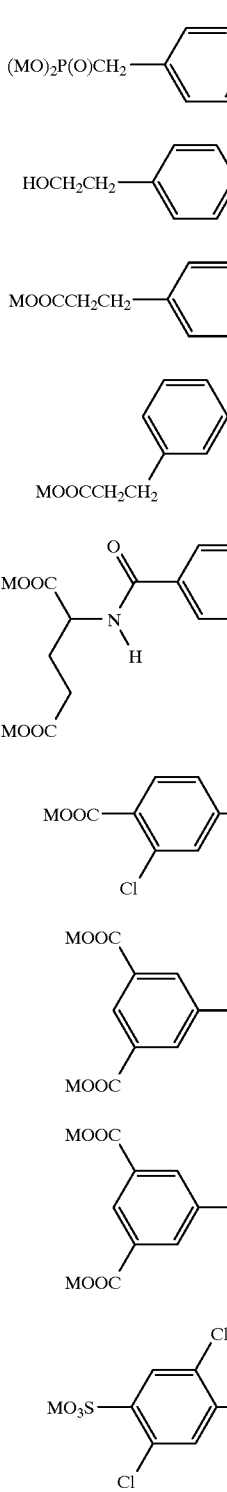 | 7 |
| 15 | 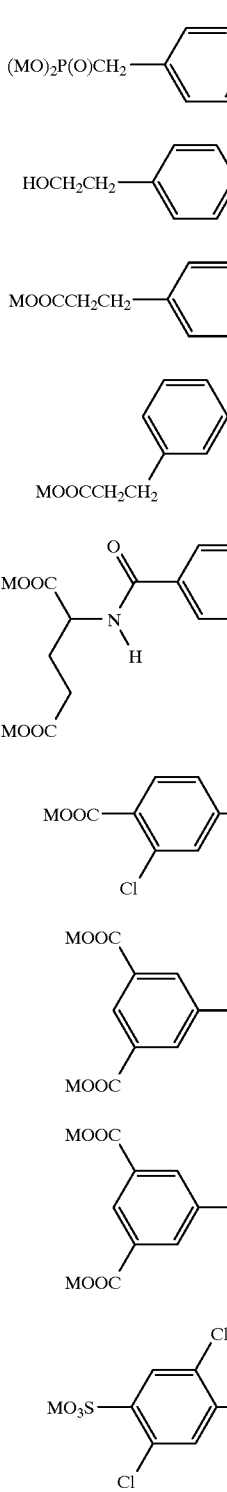 MOOC—, Cl | 7 |
| 16 | 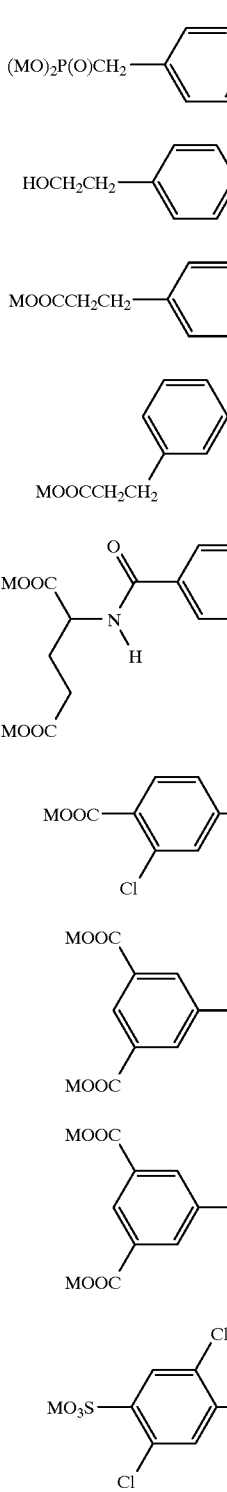 MOOC, MOOC | 7 |
| 17 | 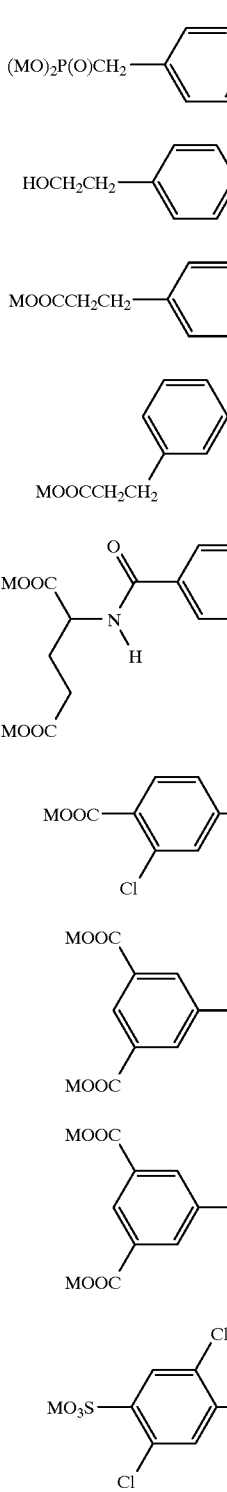 MOOC, MOOC | 6 |
| 18 | 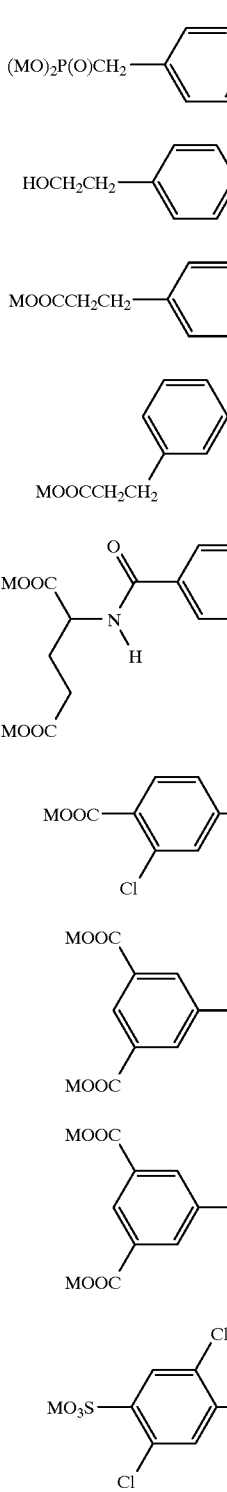 MO₃S—, Cl, Cl | 7 |
| 19 | 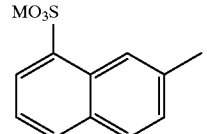 MO₃S, SO₃M | 7 |
| 20 | 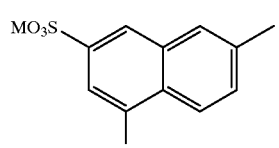 MO₃S, SO₃M | 7 |

Prepared mixtures of compounds of general formulas (XII) and (XIII) are listed in Table 2. $R_4$ is SO₃M in position 7 and M is Na for all compounds. Substituent A is of formula (XVI).

(XVI)

HO—⬡—CH₃, MOOC

The ratio of the peak areas of compounds of formulas (XII) and (XIII) was determined by HPLC.

TABLE 2

| Compound No. | Acid-binding agent used | pH value during the coupling reaction | Ratio of peak areas of compounds of formulas (XII) and (XIII) |
|---|---|---|---|
| 21 | NaOH | 9 | 1:2 |
| 22 | Na₂CO₃ | 5,5 | 1:1.5 |

The salts of known black bisazo dyes of formula (XVII)

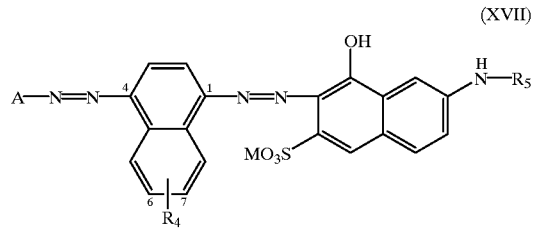

(XVII)

are listed in Table 3. $R_4$ is SO₃M and M is Na for all compounds.

TABLE 3

| Compound No. | A | Position of $R_4$ | $R_5$ | Reference |
|---|---|---|---|---|
| 23 | 3-MOOC-phenyl | 7 | —H | EP 0,597,672 |
| 24 | 3,5-bis(MOOC)-phenyl | 7 | —H | U.S. Pat. No. 5,053,495 |
| 25 | 3,5-bis(MOOC)-phenyl | 6 | —H | U.S. Pat. No. 5,053,495 |
| 26 | 3-MOOC-phenyl | 7 | —(CH$_2$)$_2$COOM | EP 0,597,672 |
| 27 | 4-MOOC-phenyl | 7 | —(CH$_2$)$_2$COOM | EP 0,597,672 |

The sodium salt of a known black bisazo dye of formula (XVIII)

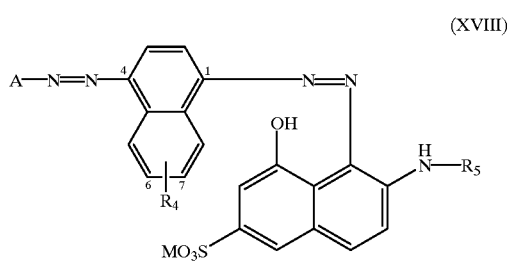

(XVIII)

is listed in Table 4. $R_4$ is SO$_3$M.

Preparation of Ink Examples

The present invention, as far as it relates to inks, is further illustrated by the following examples using dyes according to our invention described in Tables 1 and 2 and dyes representing the state of the art described in Tables 3 and 4. 100 g of each ink were prepared by heating the necessary amount of dye (3–7 g), glycerol (5 g), tetraethylenglycol (1.1 g). and a biocide solution (Promexal X50, available from Zeneca, Manchester, England) (1.2 g) together with water at a temperature of 50° C. under stirring for one hour. The resulting solution was cooled down to 20° C., pH was adjusted to 7.5 and passed through a Millipore® filter of 0.5 μm pore diameter. The dye quantity was adjusted in a way that the density of the printed images was the same for all dyes.

TABLE 4

| Compound No. | A | Position of $R_4$ | $R_5$ | Reference |
|---|---|---|---|---|
| 28 | 4-HO-3-MOOC-phenyl | 7 | —H | U.S. Pat. No. 5,616,696 |

Testing of Ink Examples

A recording medium for testing purposes was prepared in the following way:

30 g of gelatin with a high isoelectric point (type St 70,810, available from Deutsche Gelatinefabriken, Eberbach, Germany) were dissolved in 360 ml of deionised water. 1 g of a surfactant (Olin 10G, available from Olin Corporation, Norwalk, USA) were added to this solution. Immediately before coating 6.6 g of a solution of 2-(4-dimethyl-carbamoyl-pyridino)-ethanesulfonate (3%) were added and pH was adjusted to 6.5. 100 g/m$^2$ of this solution was then coated onto a resin coated paper support using a bar coater. The recording medium prepared in this way was dried for 12 hours.

The inks were then jetted onto this recording medium with an HP560 ink jet printer from Hewlett-Packard. The properties of the printed samples were evaluated later on.

Evaluations

The evaluation methods for (A) Dye solubility, (B) color co-ordinates, (C) Smudge resistance and (D) light fastness are as follows:

(A) Dye Solubility

The dye was dispersed in deionised water and this dispersion was stirred for 1 hour at 50° C. Then the mixture was cooled down to 20° C., centrifuged and filtered. Dye solubility was calculated a) from visible spectral data of the filtered solution or b) based on the dried filter residue.

(B) Color co-ordinates

L*a*b*-values were measured on printed samples using a Gretag SPM 100 spectrometer, available from Gretag AG, Regensdorf, Switzerland.

(C) Smudge resistance

The smudge behavior of printed samples was determined by rubbing a dye patch of high density with a slightly wet finger. The smudge resistance is indicated in the following way:

⊕: No or little smear

◊: Slight smear

ϕ: Severe smear (D) Light fastness

The printed samples were irradiated in an Atlas Ci35A Weather-O-Meter® with a r 6500 W Xenon lamp until a total illumination of 20 kJoule/cm$^2$ was reached. The density loss was measured with an X-Rite® densitometer. It is expressed as % loss of initial density.

Dye solubilities determined as described above are listed in Table 5.

TABLE 5

| Dye No. | Solubility (in g per 100 ml) |
| --- | --- |
| 3 | >20 |
| 5 | 16 |
| 8 | >20 |
| 16 | >20 |
| 24 | 12 |
| 26 | 17 |

The dyes according to our invention 3, 8 and 16 show a considerably higher solubility than the previously known dyes 24 and 26.

The absorption maxima and the results of the tests (B) to (D) are listed in Table 6 for the dyes of the invention and in Table 7 for the dyes that are state of the art.

TABLE 6

| Compound No. | λ$_{max}$ in water (nm) | L*a*b*-value | Smudge resistance | Density loss in % |
| --- | --- | --- | --- | --- |
| 1 | 582/440 | | ◊ | |
| 2 | 573 | 2.1/2.0/0.3 | ◊ | 0 |
| 3 | 575 | 4.3/2.5/−2.5 | ◊ | 5 |
| 4 | 577 | 8.9/14.4/−7.5 | ⊕ | 7 |
| 5 | 576 | 7.3/2.0/−2.4 | ⊕ | 6 |
| 6 | 573 | 7.5/14.6/−6.4 | ⊕ | 8 |
| 7 | 576 | 15.5/5.2/−5.9 | ⊕ | 1 |
| 8 | 577 | 17.3/4.0/−6.6 | ⊕ | 14 |
| 9 | 575 | 22.9/11.0/−5.2 | ⊕ | 14 |
| 10 | 578 | 2.0/1.5/0.1 | ø | 13 |
| 11 | 577 | 18.3/4.2/−3.1 | ⊕ | 11 |
| 12 | 576 | 12.1/3.8/−3.1 | ⊕ | 4 |
| 13 | 575 | | ø | 4 |
| 14 | 576 | 19.5/7.5/2.4 | ◊ | 2 |
| 15 | 590 | 4.7/4.5/−1.7 | ⊕ | 8 |
| 16 | 580 | 3.8/3.4/0.5 | ø | 1 |
| 17 | 568 | 5.7/2.6/2.3 | ø | 2 |
| 18 | 553 | 3.5/4.4/0.3 | ⊕ | 5 |
| 19 | 581 | | ⊕ | 1 |
| 20 | 582 | 9.4/3.8/−3.6 | ⊕ | 3 |
| 21 | 565 | 2.3/1.0/0.0 | | 6 |
| 22 | | 9.9/4.4/−5.8 | | 5 |

TABLE 7

| Compound No. | λ$_{max}$ in water (nm) | L*a*b*-value | Smudge behavior | Density loss in % |
| --- | --- | --- | --- | --- |
| 23 | 570 | | ø | 2 |
| 24 | 571 | 27.0/−0.7/−8.8 | ⊕ | |
| 25 | 556 | 10.6/11.7/−0.6 | ø | 2 |
| 26 | 568 | 14.7/14.4/−14.6 | | 8 |
| 27 | 564 | 23.7/15.1/−16.6 | | 12 |
| 28 | | 18.8/18.1/−4.1 | | |

Black dyes show a neutral hue if the values of a* and b*out of the L*a*b* color co-ordinates are zero.

A comparison of measured color co-ordinates of printed samples clearly shows that inks containing the dyes according to the invention 5, 7, 8, 12, 15, 18 and 20 from Table 6 give neutral blacks, show excellent light fastness and smudge resistance and do not show bronzing.

The known black dyes 23 to 28 from Table 7 do not show the three required properties (neutral black, excellent smudge resistance and good light fastness) in combination.

Comparative examples have been made with two commercially available black inks (Comparative inks C - 1 and C - 2). Results with these comparative inks are listed in Table 8.

TABLE 8

| Black ink | L*a*b*-value | Smudge resistance | Density loss in % |
| --- | --- | --- | --- |
| Comparative ink C - 1 | 4,7/7.3/−5.5 | ⊕ | 9 |
| Comparative ink C - 2 | 4,2/5.7/−1.0 | ◊ | 13 |

The light fastness of the dyes of the invention (Table 6) is considerably higher than the light fastness of the dyes incorporated in the commercially available inks (Table 8).

I claim:
1. A bisazo dye of formula (IX)

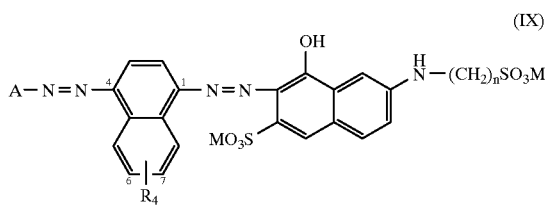

and of formula (X)

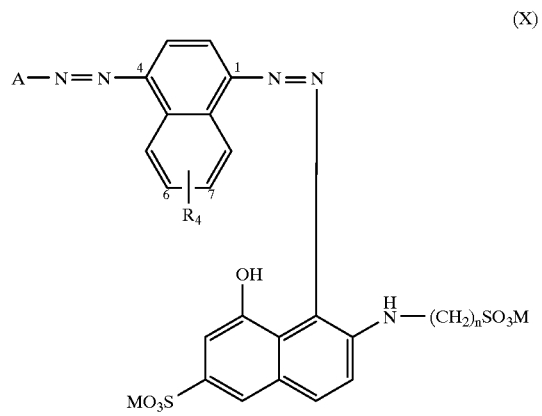

wherein
A represents optionally substituted phenyl or optionally substituted naphthyl of general formula (XI),

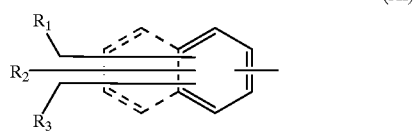

wherein $R_1$, $R_2$ and $R_3$ independently represent hydrogen, $SO_3M$, COOM; carboxamido, N-substituted carboxamido, optionally substituted alkyl with 1 to 18 C atoms, optionally substituted alkoxy with 1 to 18 C atoms, halo, hydroxy, cyano or optionally substituted thioalkyl with 1 to 18 C atoms; provided that A represents substituted phenyl;
or independently represent hydrogen, $SO_3M$ or COOM; provided that A represents substituted naphthyl;
$R_4$ represents hydrogen or $SO_3M$;
n is 2, 3 or 4; and
M represents hydrogen, a metal cation or an ammonium cation, optionally substituted by one or more alkyl or substituted alkyl groups each having 1 to 18 C atoms.
2. A bisazo dye according to claim 1, wherein
A represents substituted phenyl, where $R_1$ represents $SO_3M$ or COOM and $R_2$ and $R_3$ are selected from the group consisting of hydrogen, chloro, bromo, hydroxy, COOM, optionally substituted alkyl with 1 to 12 C atoms and optionally substituted alkoxy with 1 to 12 C atoms; or
A represents substituted naphthyl, substituted with 1 to 3 $SO_3M$ or COOM groups.
3. A bisazo dye according to claim 2, wherein
A represents substituted phenyl, where $R_1$ represents $SO_3M$ or COOM and $R_2$ and $R_3$ are selected from the group consisting of hydrogen, chloro, hydroxy, COOM, optionally substituted alkyl with 1 to 6 C atoms and optionally substituted alkoxy with 1 to 6 C atoms; or
A represents substituted naphthyl, substituted with 1 or 2 $SO_3M$ groups.
4. A bisazo dye according to claim 1, wherein
$R_4$ is in position 6 or 7.
5. A bisazo dye according to claim 1, wherein the number of $SO_3M$ groups is higher than the number of COOM groups.
6. A bisazo dye according to claim 1, wherein n is equal to 2.
7. Process for the preparation of bisazo dyes according to claim 1, wherein an amine of general formula (XIV)

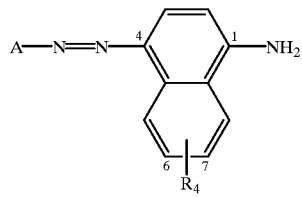

where
A and $R_4$ are as defined in claim 1, is diazotized and coupled with a compound of general formula (XV)

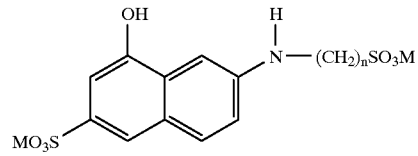

where
n and M are as defined in claim 1.
8. Process for dyeing cellulose containing materials, paper, viscose, leather or wool by applying thereto a bisazo dye according to anyone of claims 1 to 6.
9. A liquid dye preparation comprising one or more dyes according to anyone of claims 1 to 6.
10. An ink for ink jet printing comprising a dye or a mixture of dyes according to anyone of claims 1 to 6.

* * * * *